(No Model.)
J. W. MILLER.
COFFEE AND SPICE MILL.
No. 345,441. Patented July 13, 1886.
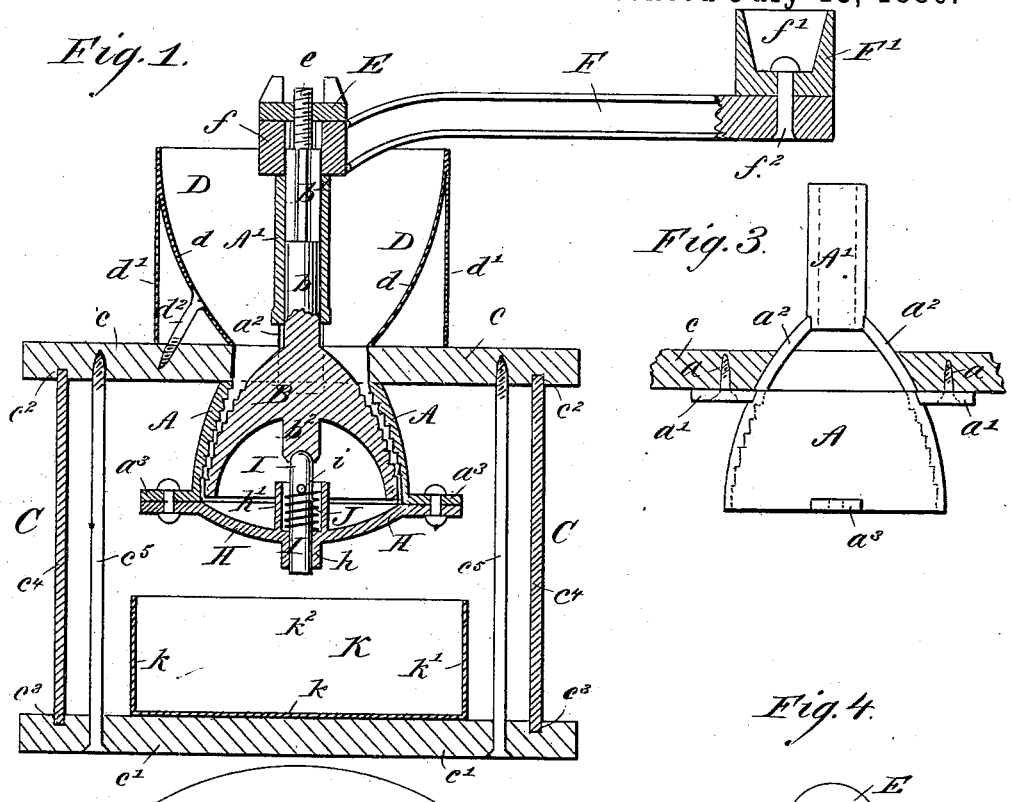
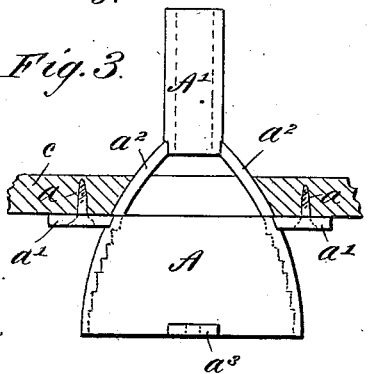
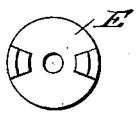
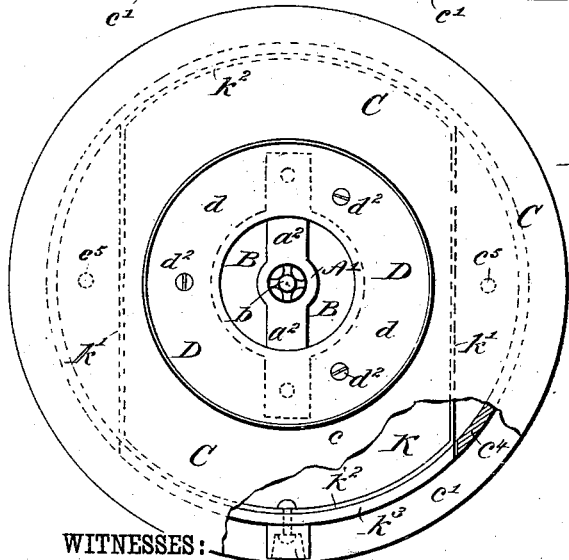
WITNESSES:
Donn Twitchell
C. Sedgwick
INVENTOR:
J. W. Miller
BY Munn & Co
ATTORNEYS.

United States Patent Office.

JAMES WASSON MILLER, OF BUTLER, PENNSYLVANIA, ASSIGNOR TO HIMSELF AND ALBERT W. BAIRD, OF SAME PLACE.

COFFEE AND SPICE MILL.

SPECIFICATION forming part of Letters Patent No. 345,441, dated July 13, 1886.

Application filed February 2, 1886. Serial No. 190,615. (No model.)

*To all whom it may concern:*

Be it known that I, JAMES WASSON MILLER, of Butler, county of Butler, and State of Pennsylvania, have invented a new and Improved Coffee and Spice Mill, of which the following is a full, clear, and exact description.

My invention relates to mills designed more especially for grinding coffee and spices, but is applicable also for reducing other substances; and the invention has for its object to provide a simple and inexpensive mill which will operate easily and effectively and present a neat appearance.

The invention consists in certain novel features of construction and combination of parts of the mill, all as hereinafter fully set forth and claimed.

Reference is to be had to the accompanying drawings, forming a part of this specification, in which similar letters of reference indicate corresponding parts in all the figures.

Figure 1 is a central vertical sectional elevation of my improved coffee and spice mill. Fig. 2 is a plan view thereof, with the driving-crank and adjusting-nut removed, and with the case or box partly broken away and in section. Fig. 3 is a detail view, in side elevation, of the shell in which the grinding cone works, taken at a right angle to the shell, as shown in Fig. 1; and also shows the means for attaching the shell to the top of the case of the mill, which is shown in part and in section. Fig. 4 is a plan view of the adjusting-nut; and Fig. 5 is a plan view of the inner end of the driving crank of the mill.

The shell, A, in which the grinding-cone B of the mill works, is largest in diameter at the bottom, whence it tapers upward in curved close sides to a point about in line with the under side of the top, $c$, of the case or box C of the mill, and to which top the shell is fastened by screws $a$, passed through lugs $a'$ cast on the shell. (See Fig. 3.) Above the lugs $a'$, diametrically opposite curved bars $a^2 a^2$ project from the body of the shell to give support therefrom to the long journal or hollow shaft A', in which the long stem $b$ of the grinding-cone B has its bearing, and between these bars $a^2 a^2$ the coffee or other substances to be ground feeds downward by gravity from the mill-hopper D, between the serrated or toothed outer face of the cone B and the inner toothed or serrated face of shell A, for reducing the substance to a degree of fineness, which may be regulated by adjusting the nut E, which is threaded to the screw end $e$ of the stem of the grinding-cone. The inner end or collar $f$ of the crank F has an orifice, G, shaped to fit the fluted upper end portion, $b'$, of the cone-stem $b$, which allows the cone-stem to slide freely in the crank while the cone is being adjusted by the nut E, and compels the cone to turn when the crank is turned.

The shell A has cast at its lower edge and at right angles to the lugs $a\ a$, the lugs $a^3 a^3$, to which is fastened by screws or rivets a crossbar, H, which extends below the grinding-cone B, and has on its lower side a boss or collar, $h$, in which is fitted to slide snugly the pin I, and at the upper face of the bar H there is a collar, $h'$, enough larger than the pin I to allow a spiral spring, J, to be placed around the pin, between the bar H and a cross-pin, $i$, fixed in the pin I near its upper end. This spring J tends to expand and force the rounded upper end of the pin I into a correspondingly-shaped recess made in the lower end of a stud, $b^2$, which is cast on and is pendent from the center of the inside of the grinding-cone B. The pin I supports, centers, and steadies the grinding-cone at its lower end, and the pin will move up or down with the cone as the cone may be adjusted by the nut E.

The crank F is provided with a knob or handle, F', which may be struck up or cast in metal or turned from wood, so as to provide an upper central recess, $f'$, through the floor of which a screw-bolt or rivet, $f^2$, is passed for attaching the knob to the crank.

The serrated exterior grinding-surface of the cone B, by being convexed or curved, instead of being formed inclined from its upper smaller to its lower larger end, presents a greater grinding-surface, and also will have greater strength for a given size and weight of the cone than if the sides of the cone were straight.

I make the hopper D preferably of a single piece of sheet metal, struck up by a die to form the inner bowl-shaped portion, $d$, and the outer vertical wall, $d'$, which rest on top of the case C, to which the hopper is fastened by screws $d^2$, passed through the bowl $d$. (See Figs. 1 and 2.)

The case C consists of the top $c$ and a bottom, $c'$, rounded marginally, and provided with annular grooves $c^2$ $c^3$, respectively, into which the opposite edges of the cylindrical sheet-metal body or side wall, $c^4$, of the case is fitted, and the whole is held together by long wood screws or bolts $c^5$, passed upward into the case-top $c$, through its bottom $c'$, as shown in Fig. 1.

The drawer K, which receives the ground coffee or spices, is made in the form clearly shown in full and dotted lines in Figs. 1 and 2, and of sheet metal cut out and bent up and soldered to form a flat bottom, $k$, straight sides $k'$ $k'$, and curved ends $k^2$ $k^2$, and one end of the drawer is attached to a correspondingly-shaped loose section or part, $k^3$, of the body or side wall, $c^4$, of the case; and the part $k^3$ has fixed to it a knob, $k^4$, by means of which the drawer may be opened and closed.

With the hopper D and case C made and connected as above described, the mill presents a very neat appearance, and the exterior surfaces of the hopper and case may have any desired plain or ornamental finish.

Having thus fully described my invention, I claim as new and desire to secure by Letters Patent—

The combination, with the grinding-cone having in its concaved under side a pendent stud and the surrounding shell, of the cross-bar bolted at its ends to the lower edge of said shell and provided with a boss or collar upon its lower side and with a collar upon its upper side, the pin being fitted to slide snugly in the lower collar or boss of said cross-bar and entering at its upper end the pendent stud of said grinding-cone, and the spring held upon said pin and between the latter and the upper collar of said cross-bar, substantially as and for the purpose set forth.

JAMES WASSON MILLER.

Witnesses:
FRANK KOHLER,
J. W. RUSSELL.